Z. L. SUTTON.
FOLDING CRATE.
APPLICATION FILED MAY 4, 1912.
1,066,338.
Patented July 1, 1913.
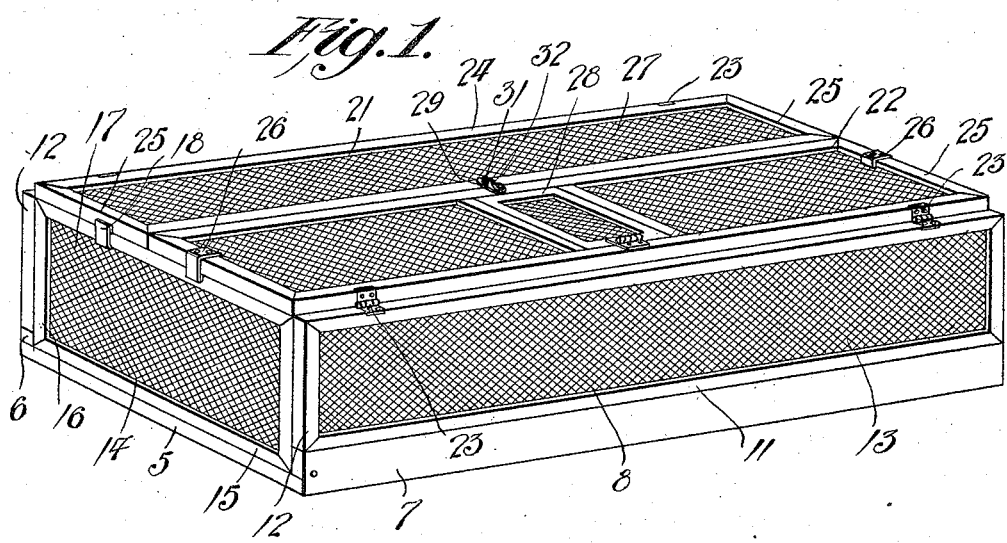
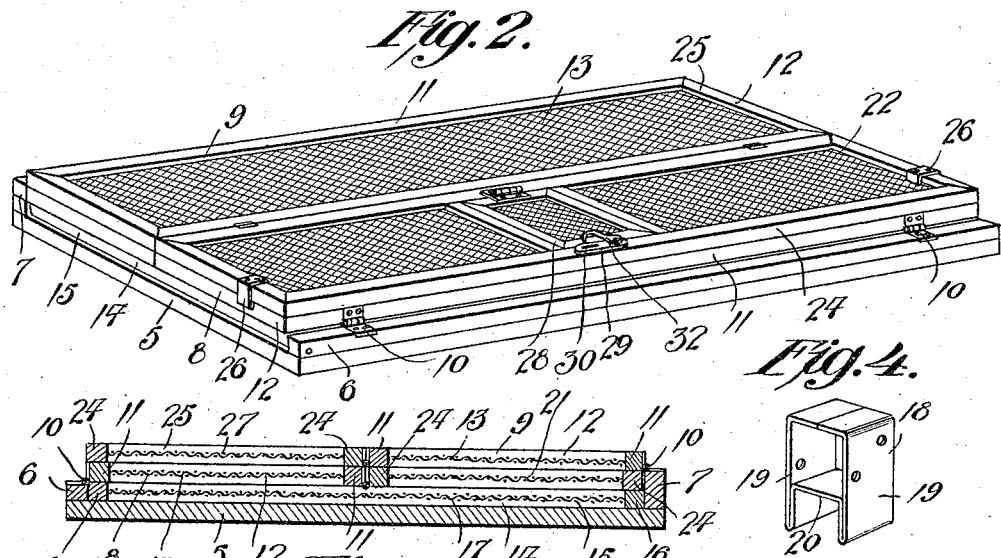
Witnesses
Carroll Bailey.
E. L. Mueller
Inventor
Zoa L. Sutton,
By Victor J. Evans
Attorney

UNITED STATES PATENT OFFICE.

ZOA L. SUTTON, OF LITTLE ROCK, ARKANSAS.

FOLDING CRATE.

1,066,338.   Specification of Letters Patent.   Patented July 1, 1913.

Application filed May 4, 1912. Serial No. 695,145.

*To all whom it may concern:*

Be it known that I, ZOA L. SUTTON, a citizen of the United States, residing at Little Rock, in the county of Pulaski and State of Arkansas, have invented new and useful Improvements in Folding Crates, of which the following is a specification.

The general object of this invention is the provision of a sectional knock-down or foldable crate which is adapted to be used for housing poultry and which is so constructed as to occupy a small amount of space when in its folded position.

In carrying out the objects of the invention generally stated above, it will be understood, of course, that the essential features thereof are susceptible to changes in details and structural arrangements, one preferred and practical embodiment being shown in the accompanying drawing, wherein:—

Figure 1 is a perspective view of the crate constructed in accordance with the invention. Fig. 2 is a similar view of the crate in its folded position. Fig. 3 is a transverse sectional view of the crate in its folded position. Fig. 4 is a perspective view of one of the clips for retaining the side and end sections in their upright positions.

Referring more particularly to the accompanying drawing it will be seen that the invention comprises a solid bottom 5 having secured thereto at one of its longitudinal edges an upstanding bar 6 and through its other longitudinal edge an upstanding bar 7, the latter bar being of greater width than the former. The side sections 8 and 9 of the crate are hinged to the bars 6 and 7 respectively by means of the hinges 10. Each of the side sections comprises the longitudinal strips 11 and transverse strips 12 having mounted therebetween the wire netting 13 in order to prevent the escape of poultry from the crate. Hinged to the transverse edges of the bottom 5 are the end sections 14 which comprise the longitudinal strips 15 and transverse strips 16, said end sections being closed by means of the wire netting 17. Secured to the free longitudinal strips 15 of each of the end sections is a holding clip 18, said clip being made of a single strip of metal bent to form parallel arms 19 which are adapted to be secured to the edges of the said longitudinal strips 15. The arms 19 are bent inwardly upon themselves to provide a U-shaped seat 20 for the reception of the top of the crate which will be presently described.

The top of the crate comprises a pair of sections 21 and 22 which are connected to the free longitudinal strips 11 of the side sections 8 and 9 by means of the hinges 23. Each of the top sections is constructed in a similar manner to the side and end sections of the crate and comprises the longitudinal and transverse strips 24 and 25. The clips 18 are secured to each of the longitudinal strips 15 of the end sections at a point adjacent one end thereof so that when the crate is in its set-up position, said clips will be adapted to receive the transverse strips 25 of the top section 21, thus retaining said top section in position and preventing lateral movement thereof. The top section 22 has secured to each of its transverse strips 25 a clip 26 which is similar in construction to the clips 18 carried by the end section but which are secured to the top section 22 in reverse position to the clips 18 so that the said clip 26 will engage the adjacent longitudinal strip 15 of the end section thus preventing any lateral movement of the said top section 22. The top sections 21 and 22 are also provided with the wire netting 27 and the said section 22 has formed therein a suitable door 28 whereby access may be had to the interior of the crate. Pivotally connected to one of the longitudinal strips 25 of the top section 22 is a locking plate 29 having an opening 30 therein for the reception of a keeper 31 carried by the adjacent longitudinal top section 21. A latch 32 is also pivotally mounted upon the same pivot means used in connection with the locking plate 29, said latch being adapted to engage the keeper 31 and thus substantially retain the top section in a locking position.

When it is desired to fold the crate, the latch 32 is first disengaged from the keeper 31 and the top section 22 is then swung outwardly upon its hinges 23. The section 21 is then disengaged from the clips 18 thus permitting the end sections 14 to be swung inwardly upon the bottom 5 of the crate. The side section 8 and the top section 21 are then swung inwardly so that the same will rest upon the end sections 14. By reason of the greater width of the bar 7, the side section 9 and top section 22 will be adapted to be swung upon the seat and top sections 8 and 21 and rest upon the same in a substantially horizontal position. When in this position the clips 26 carried by the top section 22 will engage the transverse strips 12 of the side section 8 and thus retain the said top section 22 in engagement therewith. The crate is locked in its folded position by engaging the locking plate 29 with a keeper 33 carried by one of the longitudinal strips 11 of the side section 8. The latch 32 is then swung into engagement with the keeper 33 thereby locking the crate in its folded position.

From the foregoing description it will be obvious that the invention contemplates providing a crate which is simple in construction thus reducing the cost of manufacture of the same to a minimum, and which is durable and effective in operation.

What is claimed is:—

A crate comprising a bottom, side sections hinged thereto, top sections hinged to said side sections, end sections hinged to said bottom, clips carried by one of said top sections and adapted to engage said end sections, and similar clips carried by said end sections and adapted to engage the other of said top sections, said clips being formed from a single length of material bent to provide spaced parallel arms, the intermediate portion of said arms being bent inwardly to provide a substantially U-shaped seat for the reception of either the end or top section.

In testimony whereof I affix my signature in presence of two witnesses.

ZOA L. SUTTON.

Witnesses:
JAS. O. JOHNSON,
ETTA BLACKBURN.

Copies of this patent may be obtained for five cents each, by addressing the "Commissioner of Patents, Washington, D. C."